Sept. 9, 1952 W. BRANDT 2,610,256

DIAL SET FOR CARRIER OR 2-WIRE LINES

Filed Nov. 5, 1949 2 SHEETS--SHEET 1

INVENTOR.
WALTER BRANDT

BY

Robert Harding Jr.
ATTORNEY

Sept. 9, 1952 W. BRANDT 2,610,256

DIAL SET FOR CARRIER OR 2-WIRE LINES

Filed Nov. 5, 1949 2 SHEETS—SHEET 2

INVENTOR.
WALTER BRANDT
BY
Robert Harding Jr.
ATTORNEY

Patented Sept. 9, 1952 2,610,256

UNITED STATES PATENT OFFICE 2,610,256

DIAL SET FOR CARRIER OR 2-WIRE LINES

Walter Brandt, Jersey City, N. J., assignor to Federal Telephone and Radio Corporation, New York, N. Y., a corporation of Delaware Application November 5, 1949, Serial No. 125,809

14 Claims. (Cl. 179—84)

Figure 1:
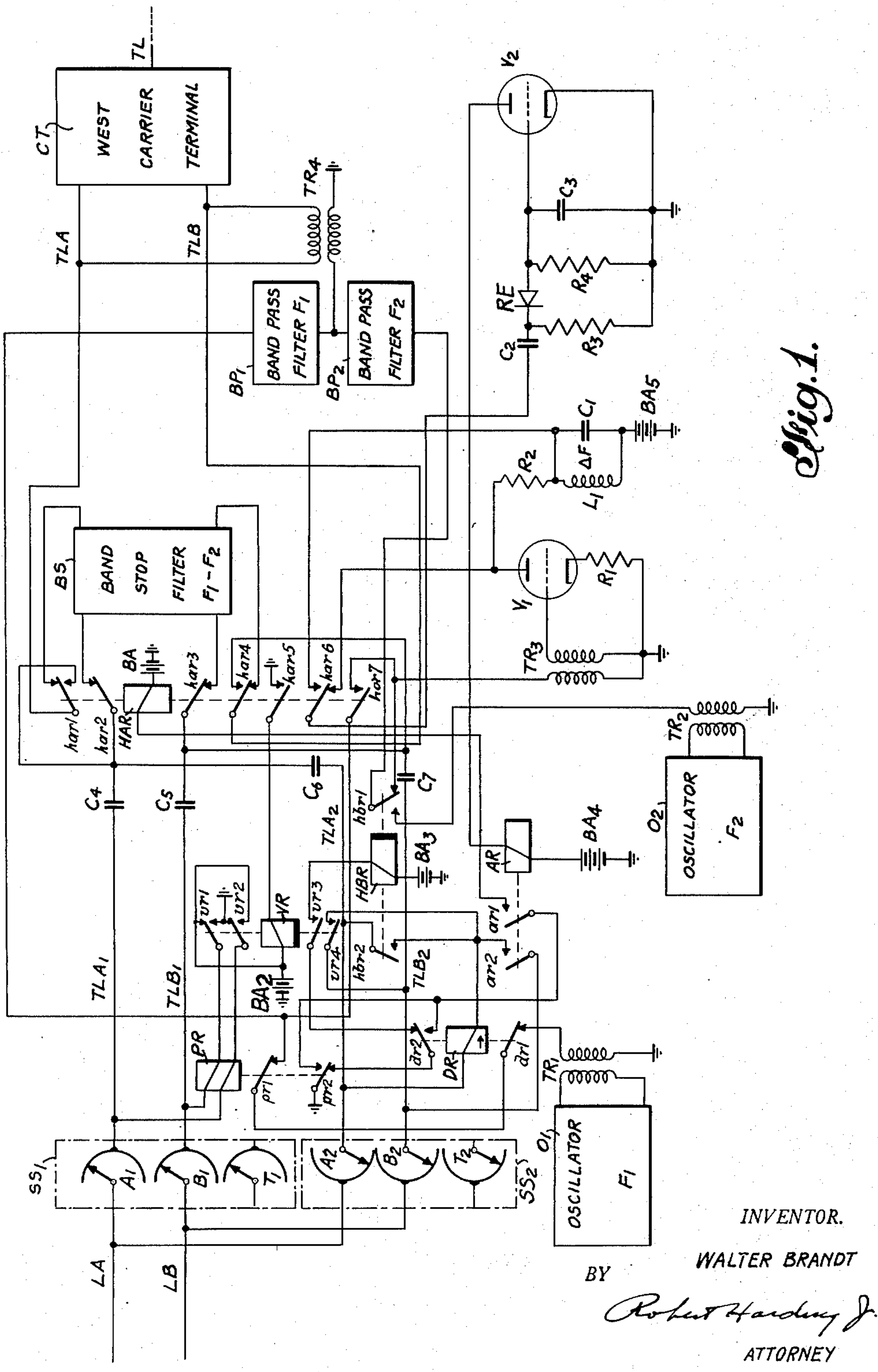

The present invention relates to switching arrangements for one or two way communication systems in which a connection between two lines is to be established and dissolved in response to signals arriving over one or the other line.

The general object of the invention is to provide, in a communication system, switching means responsive to two signal frequencies transmitted in both directions over the communication channel interconnecting the two lines; another object resides in the provision of means for preventing the signal frequencies from reaching the subscribers connected to the lines and for avoiding false operation due to speech waves, where the system is used for telephone communication purposes and the signal frequencies are within the band of voice frequencies transmitted.

According to the invention, the two signal frequencies are continuously transmitted from a respective end of the communication channel to the other until a supervisory signal received over one line, indicating an incoming call, interrupts the signal frequency at the corresponding end, thereby initiating switching operations at the other end which extend the call over the second line, whereupon a second supervisory signal, received over the second line to indicate the establishment of a connection, interrupts the other signal frequency, thereby initiating switching operations at the first end to transmit an indication of the completion of the connection over the first line.

If the invention is applied to a telephone system, filter means should be provided for preventing the signal frequencies from proceeding over the lines toward the subscriber stations and for preventing voice frequencies transmitted over the line from causing false operation, and the switching arrangement is preferably designed in such manner as to take the filter means out of the system, as long as a conversation is carried on between the two subscribers. Special safeguards may further be provided to enable the system to be restored to normal by the reception of a further supervisory signal through the use of the same signal frequencies without, however, permitting the voice frequencies to cause premature breakdown of the connection. Means may also be provided for indicating the end of a connection over the line opposite the one where the further supervisory signal originated.

The invention is applicable to physical or wireless communication channels including trunk and other lines interconnecting subscribers and/or exchanges, with or without carrier modulation, and the arrangement may be designed to give control over the establishment of a connection to the station or exchange which first seizes a line associated therewith while allowing the connection to be broken down from either end.

Figure 2:
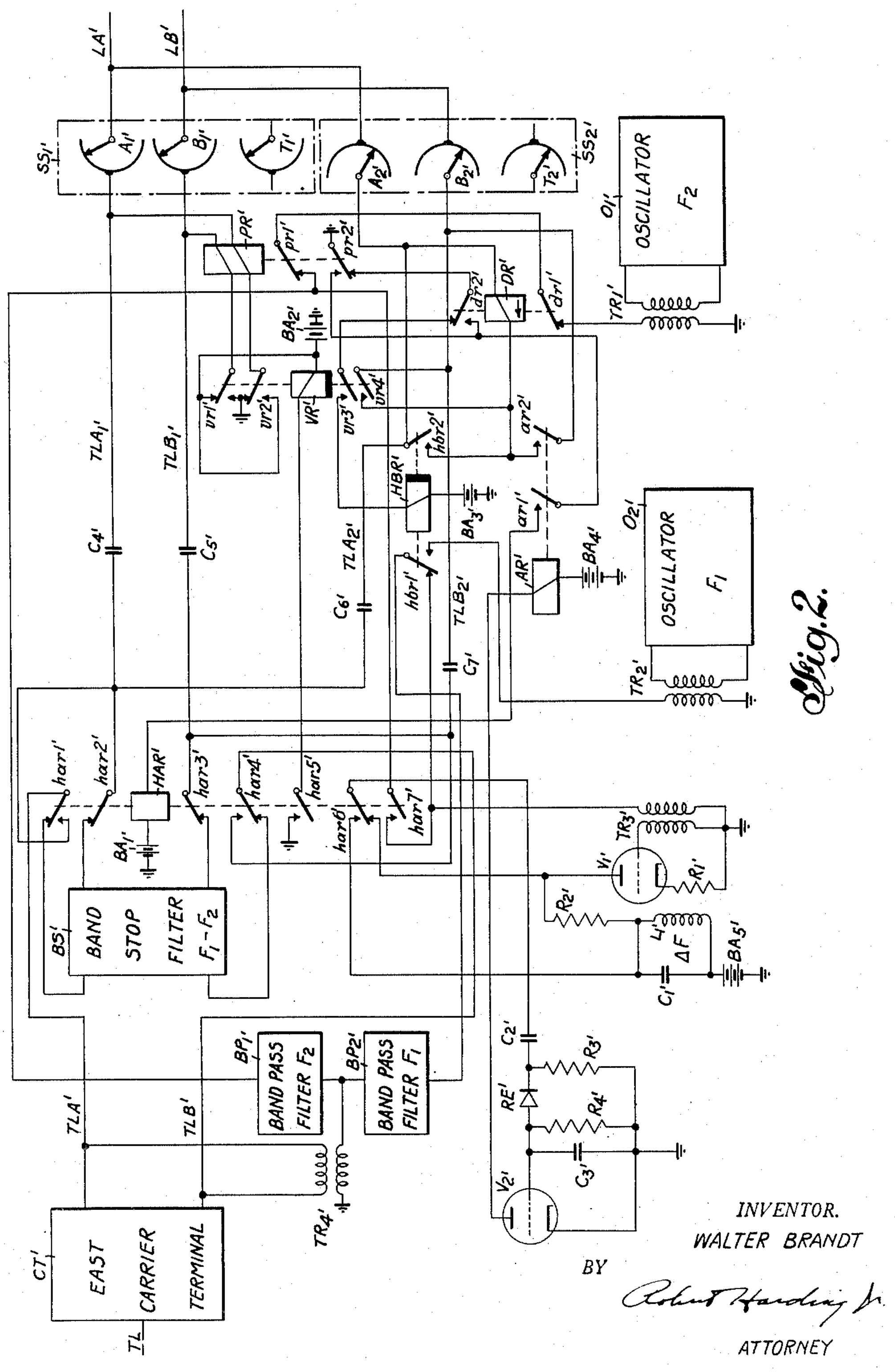

The invention will be described with reference to a two way trunk line extending between two carrier terminals each located adjacent a respective selector, such a system being shown in the accompanying drawing in which:

Fig. 1 shows so much of the equipment of a first station, located at the west end of the trunk line, as is necessary for an understanding of the invention; and Fig. 2 shows the corresponding equipment of a second station, located at the east end of the line.

The conventional parts of the west station, shown in Fig. 1, include a selector $SS_1$, a selector $SS_2$ and a carrier terminal CT. Selector $SS_1$ may be the first selector for calls proceeding from west to east while $SS_2$ may be the second selector for calls coming through in the opposite direction. Connected between conductors, LA, LB of the west line and conductors TLA, TLB leading to the carrier terminal CT are the banks $A_1$, $B_1$ of selector $SS_1$ and in parallel therewith, the banks $A_2$ and $B_2$ of selector $SS_2$; the test banks $T_1$, $T_2$ of these selectors have only their conventional functions and their complete circuits have not been shown.

Conductor TLA is connected to the $A_1$ bank of selector $SS_1$ by way of an armature *har1* and back contact of a relay HAR, a band stop filter BS, another back contact and armature *har2* of the same relay, a condenser $C_4$ and a conductor $TLA_1$; and to the $A_2$ bank of $SS_2$ by way of a condenser $C_6$, connected to the armature *har2*, and a conductor $TLA_2$. Similarly, conductor TLB is connected to the $B_1$ bank of $SS_1$ by way of an armature *har4* and back contact of relay HAR, filter BS, another back contact and armature *har3* of the same relay a condenser $C_5$ and a conductor $TLB_1$; and to the $B_2$ bank of $SS_2$ by way of a condenser $C_7$, connected to the armature *har3*, and a conductor $TLB_2$. Condensers $C_4$, $C_6$ are also connected to the front contact of armature *har1*, and condensers $C_5$, $C_7$ are also connected to the front contact of armature *har4*.

The winding of relay HAR is connectable between a battery $BA_1$ and ground by way of a front contact and armature *ar1* of a relay AR and a front contact and armature *pr2* of a two-winding relay PR; an alternative circuit leads from armature *ar1* over a front contact and armature $dr2$ of a polarized relay DR to a back contact of armature $pr2$. Relay PR is energizable from a battery $BA_2$ over reversing contacts $vr1$ and $vr2$ of a slow releasing relay VR, the selector arms $A_1$, $B_1$, conductors LA, LB and a switch, not shown, which in conventional manner is adapted to close a loop over these conductors when the west line is seized by a calling subscriber. The energizing circuit for relay VR leads from battery $BA_2$ to ground over an armature $har5$ and front contact of relay HAR.

A third armature $vr3$ of relay VR is adapted to close over its front contact an energizing circuit for a slow releasing relay HBR which leads from a battery $BA_3$ to ground over a back contact and armature $dr2$ of the relay DR. A battery, not shown, is connected in conventional manner across the conductors LA and LB with such polarity that relay DR will not be operated when the west line is seized by selector $SS_2$ and when the armature $ar2$ of relay AR engages its front contact under circumstances subsequently set forth. The winding of relay DR is shunted by the armature $hbr2$ and front contact and armature $ar2$ being shunted by a front contact and armature $vr4$ of relay VR.

The output of the first oscillator $O_1$, having a frequency $F_1$, is applied via a transformer $TR_1$, a back contact and armature $dr1$ of relay DR, an armature $pr1$ and back contact of relay PR, a band pass filter $BP_1$, tuned to frequency $F_1$, and a transformer $TR_4$ to the line formed by the conductors TLA and TLB. The back contact of $pr1$ is also connected to an armature $har7$ of relay HAR the front contact of which is connected by way of a back contact and armature $hbr1$ of relay HBR as well as a band pass filter $BP_2$, tuned to a frequency $F_2$, to a winding of a transformer $TR_4$. A second oscillator $O_2$, having the operating frequency $F_2$, works into a transformer $TR_2$ the secondary of which is connected to a front contact of armature $hbr1$.

The back contact of armature $hbr1$ is further connected to the primary of a transformer $TR_3$ the secondary of which works into the grid circuit of a vacuum tube $V_1$ having a cathode resistor $R_1$. The plate of tube $V_1$ is connected to the positive terminal of a battery $BA_5$ by way of a resistor $R_2$ in series with a resonant circuit $C_1L_1$, and is further connected over a back contact and armature $har6$ of relay HAR, a coupling condenser $C_2$ and a rectifier RE to the grid of a second vacuum tube $V_2$. The rectifier RE forms part of a biasing network for tube $V_2$, including resistors $R_3$, $R_4$ and a condenser $C_3$, and is poled in such a way as to place a negative bias on the grid of that tube when alternating voltages are applied across the biasing network. The plate of tube $V_2$ is connected to its source of potential $BA_4$ through the winding of relay AR.

A front contact of armature $har6$ is connected to the junction of resistor $R_2$ with the resonant circuit $L_1C_1$, the latter being tuned to the difference frequency $\Delta F$ of the frequencies $F_1$ and $F_2$. Band stop filter BS is tuned to the band of frequencies which lies between and including $F_1$ and $F_2$.

The circuits at the other end of the trunk line TL, shown in Fig. 2, are identical with those of Fig. 1 and corresponding elements thereof have been given the same reference characters as in Fig. 1 but have been primed for distinction; the conventional parts of the equipment of the east station thus include a carrier terminal CT', a selector $SS_1'$ which may be the first selector for calls proceeding in the east-west direction, and a selector $SS_2'$ which may be the second selector for calls coming from the west. Oscillator $O_1'$ produces, however, the frequency $F_2$ which is also the pass frequency of filter $BP_1'$, while oscillator $O_2'$ produces the frequency $F_1$ to which the filter $BP_2$ is tuned. The frequency band eliminated by the two filters BS and BS' is the same.

The operation of the circuit arrangement shown in Figs. 1 and 2 will now be described in connection with a call assumed to originate with a subscriber connected to the west line.

As long as the equipment is idle, oscillator $O_1$ transmits frequency $F_1$ to the east station over transformer $TR_1$, armatures $dr1$ and $pr1$, filter $BP_1$, transformer $TR_4$, west carrier terminal CT, line TL, east carrier terminal CT', transformer $TR_4'$, filter $BP_2'$, armature $hbr1'$ and transformer $TR_3'$; the oscillations are thus applied to the tube $V_1'$ and thence, via armature $har6'$, to tube $V_2'$ which thereby is biased negatively, thus preventing the flow of current through the latter tube and maintaining the relay AR' unoperated.

In analogous manner the frequency $F_2$ is transmitted by the oscillator $O_1'$ to the west station and blocks the tube $V_2$, thereby maintaining the relay AR unoperated.

The frequencies $F_1$ and $F_2$ may have the values of 1750 and 1900 cycles per second, for example.

When the selector $SS_1$ is stepped by dial pulses from a calling subscriber to seize the line $TLA_1$, $TLB_1$, a loop is closed in well known manner for the windings or relay PR which operates and at $pr1$ breaks the output circuit of oscillator $O_1$, thus discontinuing the transmission of frequency $F_1$ to the east station. At the latter station the bias of tube $V_2'$ disappears and relay AR' operates, preparing at $ar2'$ a loop for the operation of a relay (not shown) which is connected across conductors LA', LB' in similar manner as the relay PR is connected across conductors $TLA_1$, $TLB_1$, and which thus operates when the selector $SS_2'$ seizes the east line, thereby extending the call to the called subscriber or to another selector.

At the west end the relay PR responds to the next train of dial pulses and interrupts the frequency $F_1$ in step therewith, so that the pulses are repeated by the relay AR'. The first digit following the seizure of the trunk line TL is thus applied to the selector $SS_2'$ which is stepped in well known manner to seize the east line and any subsequent digit is transmitted toward the east by the opening and closing of the aforementioned loop formed by the armature $ar2'$ of relay AR'. It will be noted that the winding of relay DR' is included in this loop, but its polarity is such that it will not operate at this stage.

When the connection is established, a ring signal is given to the called subscriber and is heard by the calling subscriber in the usual manner, the frequency of this signal being outside the stop band of filters BS and BS'. These filters on the other hand, prevent the frequencies $F_1$ and $F_2$ from reaching the lines LA, LB and LA', LB' and in particular prevent the frequency $F_2$, which is still on, from being heard by the calling subscriber. At the same time a frequency capable of passing the band pass filters and originating, say, at the calling end cannot go beyond the filters BS to cause false operation, so that complete speech immunity of the switching arrangement is assured.

When the called subscribed answers, the current flowing in the loop which includes armature

*ar2'* and relay DR' is reversed, in well known manner, so that the relay DR' operates and at *dr1'* disconnects oscillator $O_1'$ from the system, thereby stopping the transmission of frequency $F_2$ to the west station. There the bias of tube $V_2$ disappears, relay AR operates, and relay HAR is energized over *pr2* up and *ar1* up. Armature *har5* makes its front contact and energizes relay VR which at *vr1* and *vr2* reverses the current through the windings of relay PR thereby extending the supervisory signal from the called subscriber to the calling subscriber or to any additional selector preceding the switch $SS_1$. Armatures *har1*, *har2*, *har3* and *har4* take the band stop filter BS out of the circuit.

At the east station the operation of relay DR' energizes relay HAR' over *pr2'*, *dr2'* up, *ar1'* up. The operation of relay VR' remains without effect since relay PR' is not energized, but armatures *har1'*, *har2'*, *har3'* and *har4'* take the band stop filter BS' out of the circuit. Hence the conversation can now proceed without being impeded by these filters.

At the west station the energization of relay HAR has connected the primary of transformer $TR_3$ to the output of band pass filter $BP_1$ over *har7* up and at *har6* up has changed the output connections of tube $V_1$ in such manner that the biasing network of tube $V_2$ is now only connected across the tuned circuit $L_1$ $C_1$ which presents a low impedance to oscillations of frequency $F_1$ or $F_2$. Preferably, the difference frequency $\Delta F$ (150 cycles per second in the specific example given) is selected to lie below the band of frequencies which can be transmitted without substantial attenuation over the east and west lines. Accordingly, the speech waves traveling back and forth over the line TL will generally be unable to set up a sufficient bias to de-energize either relay AR or relay AR', there having been a corresponding change in the output connections of tube $V_1'$ at the west station.

If either subscriber terminates the conversation, the circuits are restored in the following manner: Let us assume that the called subscriber (at the east end) puts down the receiver first. This again reverses the current through the winding of relay DR' and the latter releases. Relay HBR' operates over *pr2'*, *dr2'*, *vr3'* up and at *hbr2'* up closes a shunt to prevent immediate reoperation of relay DR' if the subscriber at the east side should again lift the receiver to make a new call. Armature *dr1'* reapplies frequency $F_2$ from oscillator $O_1'$ to transformer $TR_4'$ while armature *hbr1'* connect the secondary of transformer $TR_2'$ to the filter $BP_2'$, so that frequency $F_1$ is now likewise transmitted in the east-west direction. At the west station the two frequencies are intermodulated in the tube $V_1$ to produce the beat frequency $\Delta F$ which resonates the circuit $L_1C_1$ and blocks tube $V_2$, thereby de-energizing relay AR which in turn releases relay HAR. This occurs substantially simultaneously with the de-energization of relay HAR' at *dr2'*, due to the release of relay DR', and the two band stop filters BS, BS' are thus cut back into the circuit.

The release of relay HAR blocks the path between filter $BP_1$ and transformer $TR_3$ so that the following switching operations at the west station are carried out with only one frequency, speech immunity being again secured by the filters. With plate resistance $R_2$ again effectively connected in the coupling circuit between tubes $V_1$ and $V_2$, frequency $F_2$ continues to bias tube $V_2$ to cutoff; subsequently the relay VR releases and reverses the current in the west line, thereby communicating the end-of-conversation signal to the calling subscriber and resulting in due course in the release of relay PR. At the east station relay VR' releases after a predetermined time and the subsequent release of relay HBR' restores the circuits to normal, relay AR' having meanwhile been de-energized by the reapplication of frequency $F_1$ to the line at the west station.

If the conversation had been terminated by the calling subscriber (at the west end), relay PR would have released, energizing relay HBR over *pr2*, *dr2*, *vr3* up. This would have caused the application of the outputs of both oscillators $O_1$ and $O_2$ to the line, in the same manner as previously described for the east station, and the difference frequency $\Delta F$ would have appeared across the tuned circuit $L_1'C_1'$, blocking tube $V_2'$ and releasing relays AR' and HAR'. At the same time the release of PR would have broken the energizing circuit of relay HAR, at *pr2*, and the two filters BS, BS' would have been cut back into the circuit. The subsequent operation would have been similar to that previously described, except that the eventual release of VR' would have de-energized relay DR' and broken the loop across the east line, thereby communicating the end-of-conversation signal to the called subscriber.

It follows that the dissolution of the connection can be effected only if the simultaneous application of frequencies $F_1$ and $F_2$ is accompanied by the release of either PR or DR', since otherwise neither of the HBR relays will be energized and the connection will be restored immediately after cessation of the signals. Thus, if the frequency $\Delta F$ is accidentally produced by the intermodulation of speech waves, the re-insertion of the band stop filters will promptly remove the bias from the $V_2$ tubes, thereby re-operating the AR and HAR relays and again disconnecting the filters. Also, the supervisory signal indicating the end of the conversation will be transmitted only if the relay HAR or HAR' remains deenergized long enough to outlast the release time of relay VR or VR', respectively.

When a call originates at the east end, the operation will be completely analogous to those described above and do not require any further explanation.

It will thus be seen that the switching arrangement disclosed affords complete speech immunity both before and after a connection has been established, and that such an arrangement is therefore eminently suitable for use with telephone communication system, preferably with systems using impulse dialing. It is understood, however, that the invention is not restricted to this particular field of application and that it may be employed in any system where supervisory signals are transmitted between two sets of switching equipment.

Accordingly, while a specific embodiment of the invention has been described in detail, the same has been given merely by way of illustration and not as a limitation upon the scope of the invention as defined in the appended claims.

What is claimed is:

1. In a communication system, the combination with a communication channel of a first and a second set of switching equipment located at opposite ends of said channel, said first set including a source of frequency in the voice frequency range, first switching means for normally applying said frequency to said channel for transmission to the opposite end, and circuit means selectively operable to inactivate said switching means, said second set including second switching means responsive to the disappearance of said frequency to produce a supervisory signal.

2. The combination according to claim 1, further comprising filter means adjacent each set adapted to prevent the transmission of said frequency beyond the said sets.

3. In a communication system, the combination with a communication channel of a first and a second set of switching equipment respectively located at one and the other end of said channel, said first set including a source of a first frequency and first switching means for normally applying said frequency to said channel for transmission to said other end, said second set including a source of a second frequency and second switching means for normally applying said second frequency to said channel for transmission to said one end, said second set further including first signaling means responsive to said first frequency and adapted to produce a first supervisory signal upon disappearance of said first frequency, said first set further including second signaling means responsive to said second frequency and adapted to produce a second supervisory signal upon disappearance of said second frequency, said sets further including first and second circuit means, respectively, for selectively inactivating either of said switching means.

4. The combination according to claim 3 wherein each set is provided with transmission means connecting the set to a respective subscriber, further comprising filter means in each of said transmission means adapted to prevent the transmission of both of said frequencies to said subscribers.

5. The combination according to claim 4 wherein each set further comprises respective switch-over means controllable from the associated signaling means and from the associated circuit means to render the respective filter means ineffective in the operated position of both said signaling means and said circuit means.

6. The combination according to claim 5 wherein each of said switch-over means is adapted to render the respective signaling means insensitive to the re-appearance of the frequency from the opposite set, thereby maintaining said signaling means operated.

7. In a communication system the combination, with an incoming line, an outgoing line and a communication channel interconnecting said lines, of a switching arrangement comprising first wave generating means at one end of said channel, second wave generating means at the other end of said channel, said first wave generating means being tuned to produce a first frequency, said second wave generating means being tuned to produce a second frequency, first switching means at said one end normally connecting said first wave generating means to said channel so as to transmit said first frequency to said other end, second switching means at said other end normally connecting said second wave generating means to said channel so as to transmit said second frequency to said one end, first circuit means at said one end adapted to inactivate said first switching means in response to a call signal received over the incoming line, second circuit means at said other end adapted to inactivate said second switching means in response to a return signal received over the outgoing line, first signaling means at said other end responsive to said first frequency and adapted to transmit a first supervisory signal over the outgoing line upon disappearance of said first frequency, and second signaling means at said one end responsive to said second frequency and adapted to transmit a second supervisory signal over the incoming line upon disappearance of said second frequency.

8. The combination according to claim 7 wherein said first and second signaling means are adapted to transmit supervisory signals which are substantially identical with said call and return signal, respectively.

9. The combination according to claim 8, further comprising first and second filter means inserted in said incoming and outgoing line, respectively, each of said filter means being adapted to block both of said frequencies.

10. The combination according to claim 9, further comprising first switch-over means at said one end controllable from said first circuit means and from said second signaling means and second switch-over means at said other end controllable from said second circuit means and from said first signaling means for rendering inoperative said first and second filter means, respectively, in response to the arrival of said return signal subsequently to the arrival of said call signal.

11. The combination according to claim 10, further comprising third wave generating means at said one end, said third wave generating means being tuned to produce said second frequency, fourth wave generating means at said other end, said fourth wave generating means being tuned to produce said first frequency, third switching means at said one end controllable by said first signaling means to connect said third wave generating means to said channel in response to said first switching means being restored to normal by an end-of-connection signal received over the incoming line, whereby both of said frequencies are simultaneously transmitted to said other end, and fourth switching means at said other end controllable by said second signaling means to connect said fourth wave generating means to said channel in response to said second switching means being restored to normal by an end-of-connection signal received over the outgoing line, each of said switch-over means when operated being adapted to render the respective signaling means insensitive to either of said frequencies alone but responsive to a combination of both of said frequencies for rendering the respective switch-over means inoperative.

12. The combination according to claim 11 wherein each of said third and fourth switching means comprises slow-acting means adapted to transmit an end-of-connection signal to the adjacent line a predetermined period after the respective switch-over means has been rendered inoperative.

13. In a communication system the combination, with a first line, a second line and a communication channel interconnecting said lines, of a first and a second set of switching equipment adjacent said first and second line, respectively, each of said sets comprising first and second wave generating means tuned to produce two different signal frequencies, filter means connected in the adjacent line and adapted to block both of said frequencies, first relay means adapted to apply the output of said first wave generating means to said line at a point intermediate said filter means and said channel, said relay means being responsive to a call signal arriving over the adjacent line to disconnect said first wave generating means from said line, second relay means adapted to transmit a call signal over the adjacent line, signal receiving means adapted to maintain said second relay means inoperative as long as a signal frequency is received from the opposite set, third relay means adapted to disconnect said first wave generating means from said line in response to a return signal arriving over the adjacent line, fourth relay means responsive to the operation of both said second and either of the other two relay means for inactivating said filter means, said fourth relay means being adapted when operated to render said signal receiving means insensitive to either of the signal frequencies from the opposite set alone but responsive to a combination of both the last-mentioned frequencies to inactivate said second relay means, fifth relay means controlled by said fourth relay means when operated to respond to the release of both said first and third relay means to connect said second wave generating means to the adjacent line, whereby both signal frequencies produceable by the set are simultaneously transmitted over said channel, and sixth relay means adapted to transmit an end-of-connection signal over the adjacent line upon prolonged release of said fourth relay means.

14. The combination according to claim 13 wherein the first wave generating means of the first set and the second wave generating means of the second set are tuned to produce a first signal frequency, the other two wave generating means being tuned to produce a second signal frequency.

WALTER BRANDT.

REFERENCES CITED

The following references are of record in the file of this patent:

UNITED STATES PATENTS

| Number | Name | Date |
|---|---|---|
| 199,007 | Watson | Jan. 8, 1878 |
| 1,688,453 | Demarest | Oct. 23, 1928 |
| 2,131,164 | Chauveau | Sept. 27, 1938 |
| 2,408,878 | Preston | Oct. 8, 1946 |
| 2,414,795 | Brandt | Jan. 28, 1947 |
| 2,433,281 | Lord | Dec. 23, 1947 |
| 2,438,902 | Deloraine | Apr. 6, 1948 |
| 2,454,498 | Bartelink | Nov. 23, 1948 |